(12) United States Patent
Cherukuri et al.

(10) Patent No.: US 9,762,613 B2
(45) Date of Patent: Sep. 12, 2017

(54) METHOD AND APPARATUS FOR PROVIDING EXTENDED AVAILABILITY OF REPRESENTATIVES FOR REMOTE SUPPORT AND MANAGEMENT

(71) Applicants: Rajesh Cherukuri, Ridgeland, MS (US); Huey Jiun Ngo, Flowood, MS (US); John Burns Smith, III, Ridgeland, MS (US)

(72) Inventors: Rajesh Cherukuri, Ridgeland, MS (US); Huey Jiun Ngo, Flowood, MS (US); John Burns Smith, III, Ridgeland, MS (US)

(73) Assignee: BOMGAR CORPORATION, Ridgeland, MS (US)

( * ) Notice: Subject to any disclaimer, the term of this patent is extended or adjusted under 35 U.S.C. 154(b) by 170 days.

(21) Appl. No.: 13/737,776

(22) Filed: Jan. 9, 2013

(65) Prior Publication Data

US 2013/0179939 A1 Jul. 11, 2013

Related U.S. Application Data

(60) Provisional application No. 61/584,780, filed on Jan. 9, 2012.

(51) Int. Cl.
*H04L 29/06* (2006.01)
*G06F 21/62* (2013.01)

(52) U.S. Cl.
CPC .......... *H04L 63/20* (2013.01); *G06F 21/6218* (2013.01)

(58) Field of Classification Search
None
See application file for complete search history.

(56) References Cited

U.S. PATENT DOCUMENTS

| | | | |
|---|---|---|---|
| 7,240,102 B1* | 7/2007 | Kouznetsov et al. | 709/220 |
| 7,373,553 B2* | 5/2008 | Tripp et al. | 714/37 |
| 7,587,588 B2* | 9/2009 | Clemmons et al. | 713/155 |
| 8,024,399 B2* | 9/2011 | Reisman | G06F 8/65 709/203 |
| 8,156,205 B1* | 4/2012 | Forsberg | G06F 17/30905 707/634 |
| 8,527,774 B2* | 9/2013 | Fallows | G06F 21/305 713/168 |
| 2001/0051890 A1* | 12/2001 | Burgess | G06Q 10/06 705/7.14 |
| 2003/0120557 A1* | 6/2003 | Evans | G06F 21/10 705/51 |
| 2003/0131084 A1* | 7/2003 | Pizzorni | G06F 8/60 709/223 |
| 2005/0050319 A1* | 3/2005 | Suraski | G06F 21/105 713/164 |
| 2006/0159243 A1* | 7/2006 | Mangione et al. | 379/93.11 |
| 2007/0299953 A1* | 12/2007 | Walker | G06Q 10/06 709/223 |

(Continued)

*Primary Examiner* — Farid Homayounmehr
*Assistant Examiner* — Olanrewaju Bucknor

(57) ABSTRACT

A network appliance is configured to determine a security policy controlled by a system of an organization. The network appliance creates an association between the security policy and support agent access to the system. The network appliance creates portals where the access is based on the security policy and access includes connectivity for providing remote support service to the system from a remote support service disconnected from the system.

16 Claims, 18 Drawing Sheets

(56) References Cited

U.S. PATENT DOCUMENTS

| | | | |
|---|---|---|---|
| 2007/0300291 A1* | 12/2007 | Bomgaars | H04L 12/2856 726/3 |
| 2008/0244705 A1* | 10/2008 | Cromer | H04L 63/02 726/3 |
| 2009/0019367 A1* | 1/2009 | Cavagnari | G06F 21/62 715/716 |
| 2009/0052675 A1* | 2/2009 | Levow | G06F 21/33 380/278 |
| 2009/0187651 A1* | 7/2009 | Schuckenbrock et al. | 709/224 |
| 2010/0138270 A1* | 6/2010 | Werth | G06Q 10/06 379/266.09 |
| 2010/0257596 A1* | 10/2010 | Ngo et al. | 726/7 |
| 2011/0107406 A1* | 5/2011 | Frost | G06F 9/45558 726/6 |
| 2011/0302629 A1* | 12/2011 | Whitson et al. | 726/3 |
| 2012/0311564 A1* | 12/2012 | Khalid | G06F 8/61 718/1 |
| 2012/0331524 A1* | 12/2012 | Mower et al. | 726/3 |

* cited by examiner

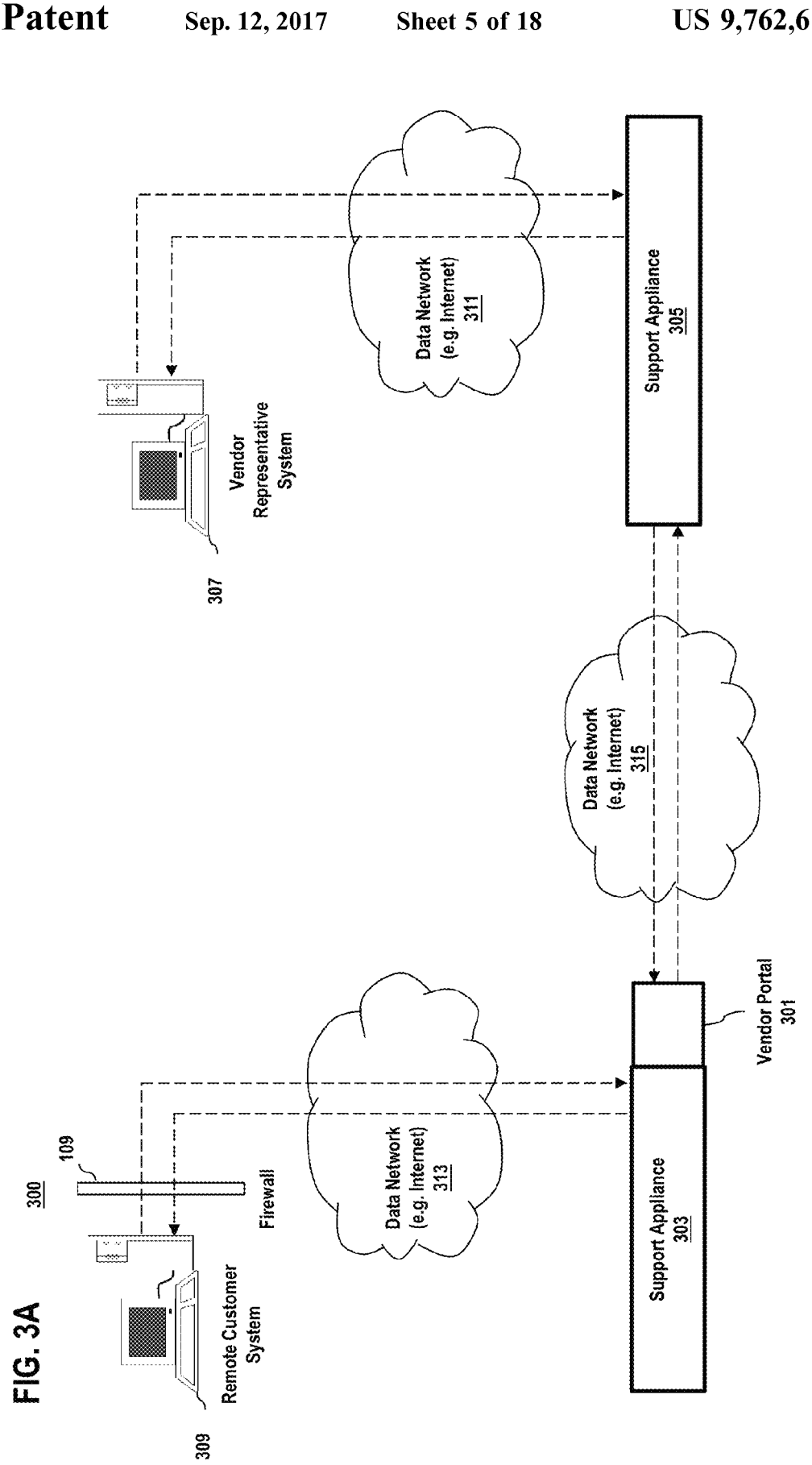

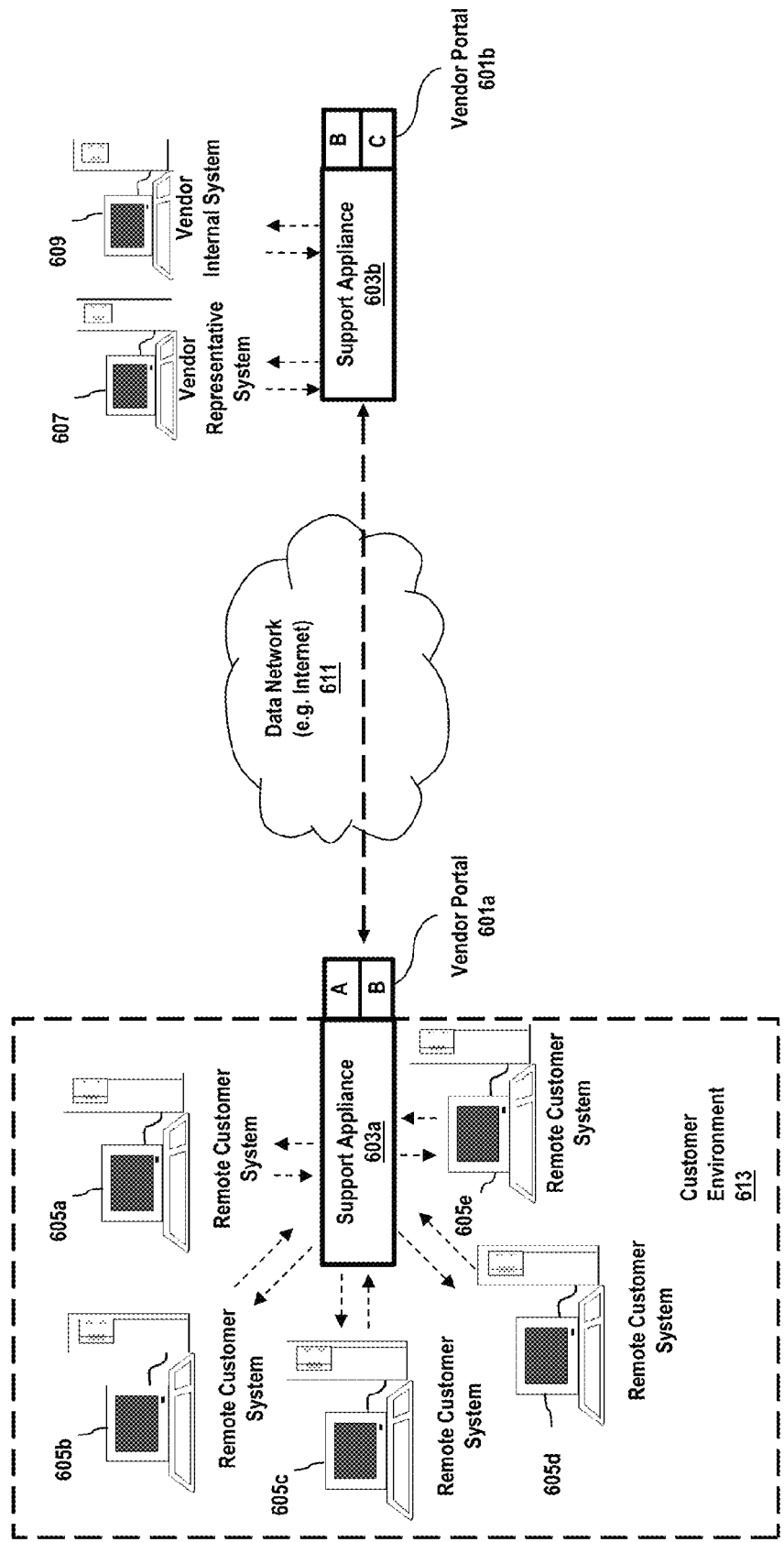

METHOD AND APPARATUS FOR PROVIDING EXTENDED AVAILABILITY OF REPRESENTATIVES FOR REMOTE SUPPORT AND MANAGEMENT

RELATED APPLICATIONS

This application claims the benefit of the earlier filing date under 35 U.S.C. §119(e) of U.S. Provisional Application Ser. No. 61/584,780 filed Jan. 9, 2012, entitled "Method and Apparatus for Providing Extended Availability of Representatives for Remote Support and Management," the entirety of which is incorporated by reference.

BACKGROUND OF THE INVENTION

Information Technology (IT) companies and departments who support their customers' computer systems are constantly challenged with the need to provide timely and cost-effective support to their customers. Remote support provides the means for IT professionals to remotely access and to control customers' computer systems. This eliminates the need for the IT professionals to travel on-site to fix a problem and the delays in response time.

Enterprises (or organizations) with tiered support structure have many challenges in providing real time collaborative support to their end users when using remote control or remote access technologies. When a system or application requires support and maintenance, a single representative is often assigned to resolve the issue. Often, that representative needs help or assistance from a more experienced representative or a subject matter expert in resolving the issue. Most remote access and remote control tools support only "all or nothing" collaboration, resulting in the representative having access to only the resources that are actively connected to the remote support system. Because of this, organizations usually schedule call backs or reopen the issue and assign it to a different representative for addressing this issue at a later time. This delay in finding the experienced representative or subject matter expert when needed to provide real time support results in customer dissatisfaction, lengthy call resolution times, and prolonged outages to business critical systems. Some organizations use tools outside of a remote support system to facilitate finding the correct representative when needed. Use of disparate systems in providing support results in lack of control and lack of audit-ability, which undermines the compliance posture of the organization and ability to enforce service level agreements.

Enterprises (or organizations) may hire or use third party vendors to provide subject matter expertise and use these vendors in providing remote support assistance. When a system or application requires support and maintenance from a vendor, the vendor must be granted access in order to service the system or application effectively. Often, each technology vendor uses a different product, leaving the organization receiving support with little or no control over what remote access or remote control technologies are used. Use of disparate systems also makes it difficult for organizations to collaborate effectively in providing real time support. Moreover, most remote access and remote control tools support only "all or nothing" access, resulting in the vendor having much greater access than is required. Because of this, the organization receiving support does not have the ability to granularly control the permissions, access, and privileges granted to the technology vendor. Another area of challenge is that existing approaches do not record the activity of the technology vendor in the process of supporting the organization that is receiving support. In other words, support incidents do not have audit trails. This lack of control and lack of audit-ability undermines the compliance posture of the organization receiving support, thereby increasing the liability associated with receiving real time technology support from a vendor.

Traditional remote support approaches using remote control and visualization application tools depend on always-on connectivity of the representatives in providing support and collaborating within support sessions. Any representative that can be invited into a support session to resolve issues is expected to be connected to the remote support system. This results in high value subject matter experts not being available for real time support as their need to be on support sessions is sporadic and does not justify the effort and expense in having them always connected to the remote support system.

Traditional remote control and visualization application tools require a pre-installed client or the end customer to download and install a client prior to the start of a support session. In order to gain efficiencies, a Push and Start System can be used by the representative of a support organization to transfer an application to an attended or unattended remote system and execute the application to establish a session connection back to the representative. The Push functionality provides reach to systems which are visible from within the network that the support representative's computer is connected to via a Local Push method and reach to systems within remote networks through a Push via a Push Agent mechanism. Support sessions established with Push and Start, even though started efficiently, would have similar real time support challenges as other support sessions.

Based on the foregoing, there is a clear need for approaches that provide real time remote support and management involving representatives or subject matter experts that are disconnected from or not always on the remote support system.

BRIEF DESCRIPTION OF THE DRAWINGS

FIGS. 3A and 3B are, respectively, diagrams of a system and associated process for providing vendor presence on a customer appliance via a vendor's appliance, according to certain embodiments;

FIGS. 6A-6C are diagrams of a system and associated processes for providing a vendor portal as an agent or a proxy, according to certain embodiments;

DESCRIPTION OF THE PREFERRED EMBODIMENT

An apparatus, method, and software for providing real time collaborative support even when representatives are disconnected from the remote support system by extending the availability of representatives are described. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

When embodiments are described with respect to a wired network, it is contemplated that these embodiments have applicability to other networks including wireless systems.

Figure 1A:
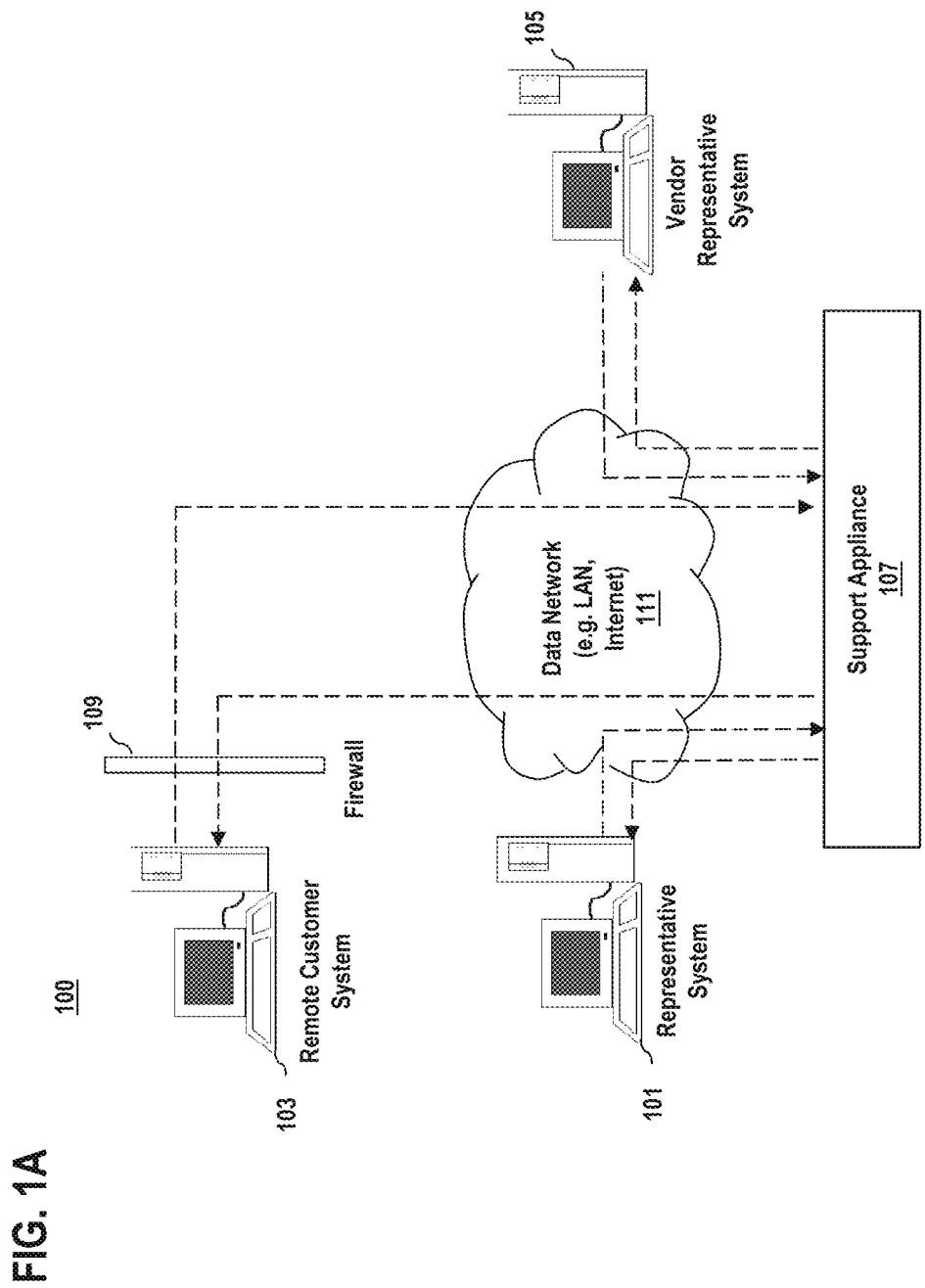
FIGS. 1A and 1B are, respectively, diagrams of a system and associated process for providing real time remote support and management, according to certain embodiments.
Figure 1B:
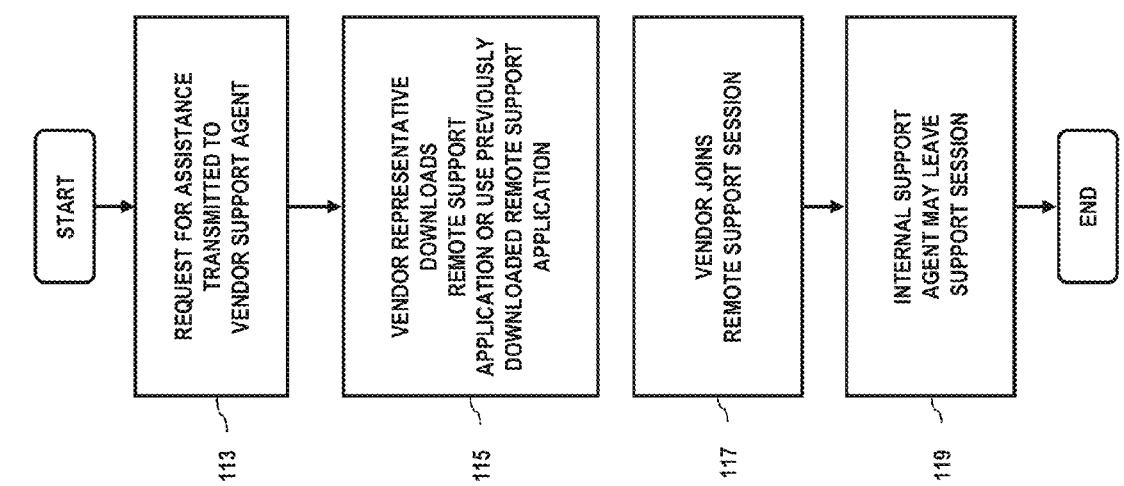

FIGS. 1A and 1B are, respectively, diagrams of a system and associated process for providing real time collaborative remote support and management by representatives or subject matter experts that are not connected to the remote support system, according to certain embodiments.

As shown, a remote access and control appliance 107 (hereinafter referred to as support appliance 107) provides, in certain embodiments, a remote support mechanism that is secure and implemented in a turn-key fashion. For the purposes of illustration, the support appliance 107 can be deployed by an organization (or a vendor) and accessed by a vendor or various vendors. A vendor is any entity that provides a support service to another entity. In other words, a vendor is a support agent. In some embodiments, the vendor may reside in the same company but in an organization different from the organization seeking support services. In other embodiments, the vendor may belong to a different company (third-party) and offer services to a system that manages a remote support system.

Figure 11:
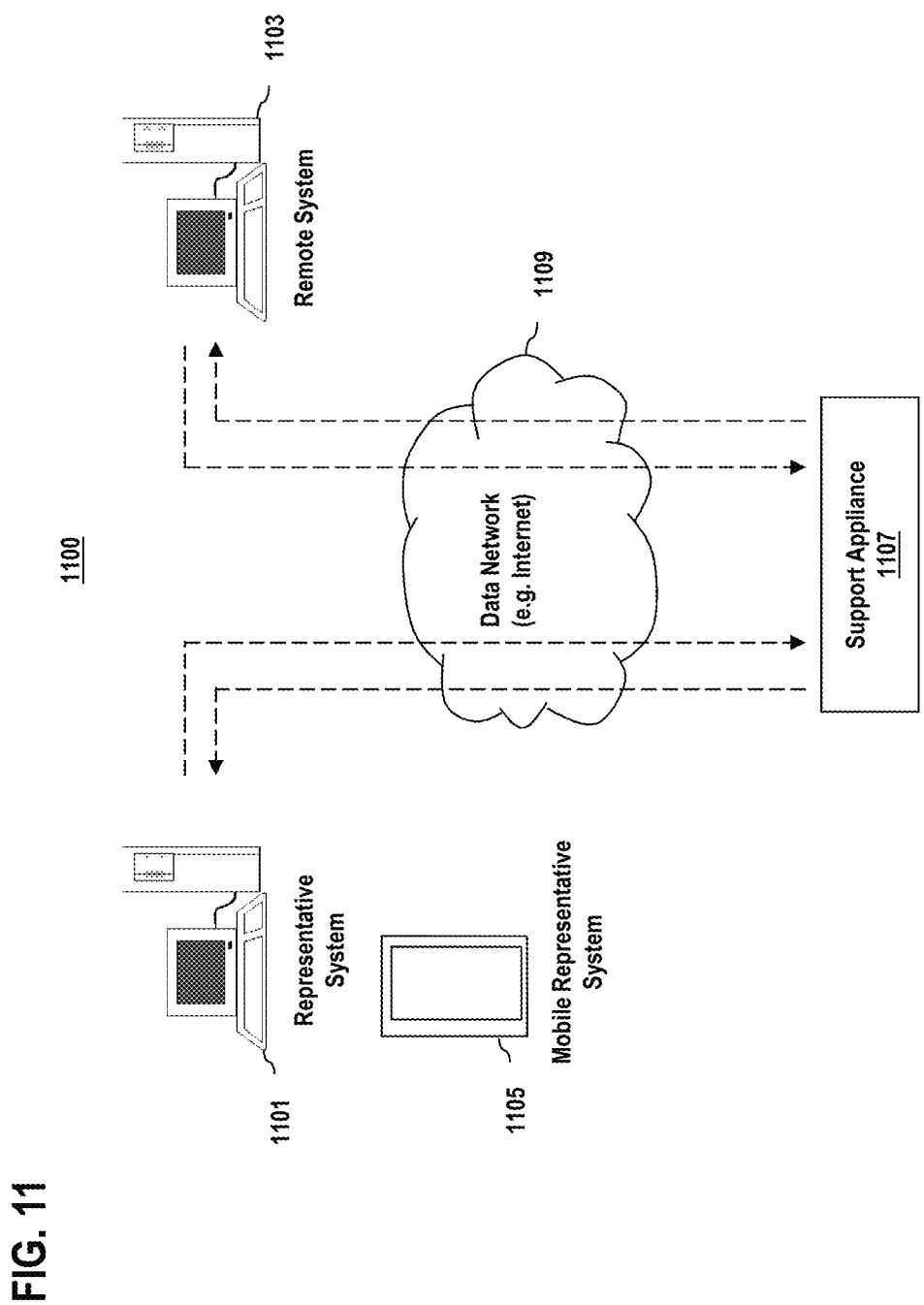
FIGS. 11-13 are diagrams of systems and associated processes for providing extended availability of representatives for remote support and management, according to various embodiments.
Figure 12:
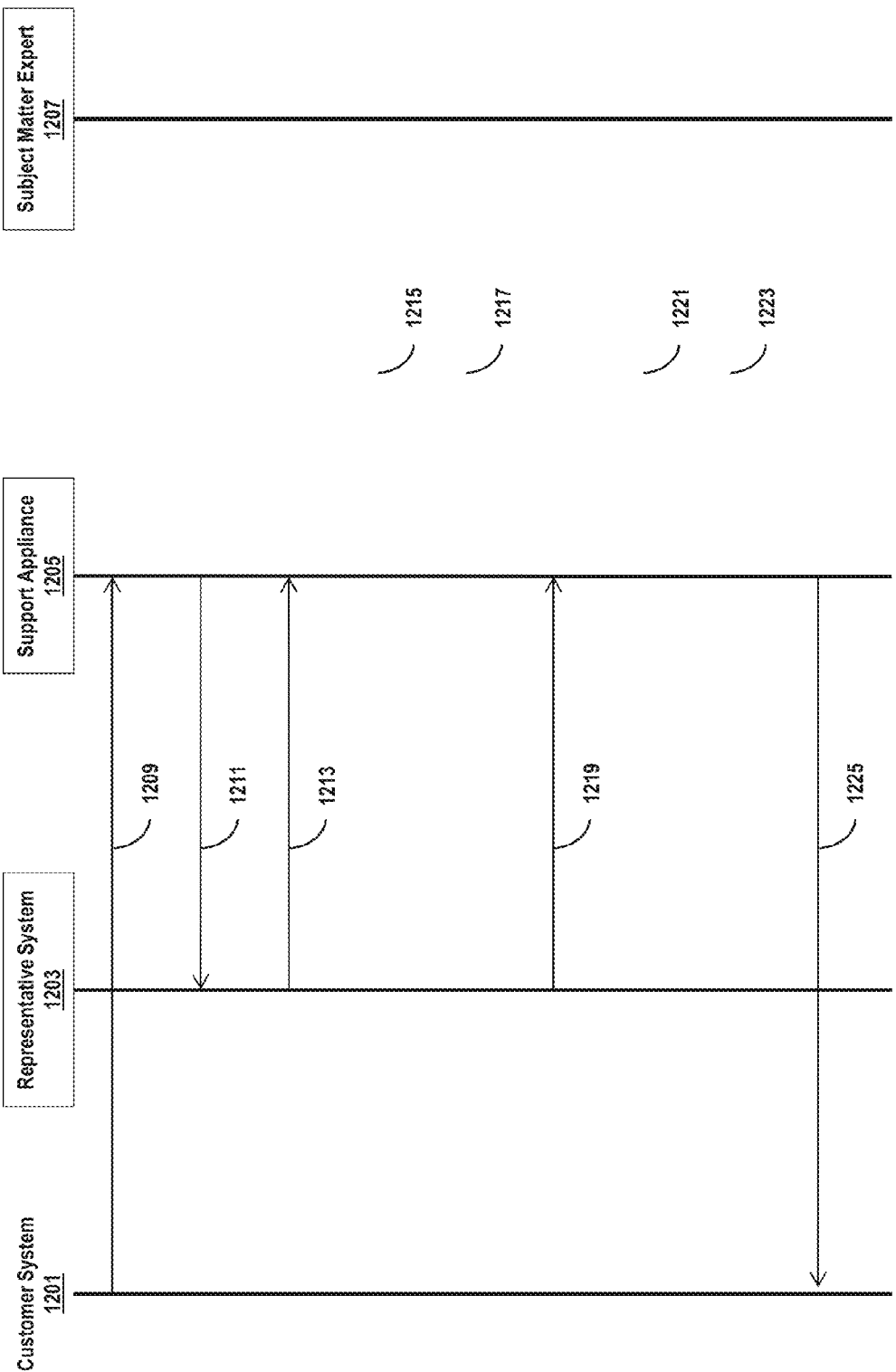
Figure 13:
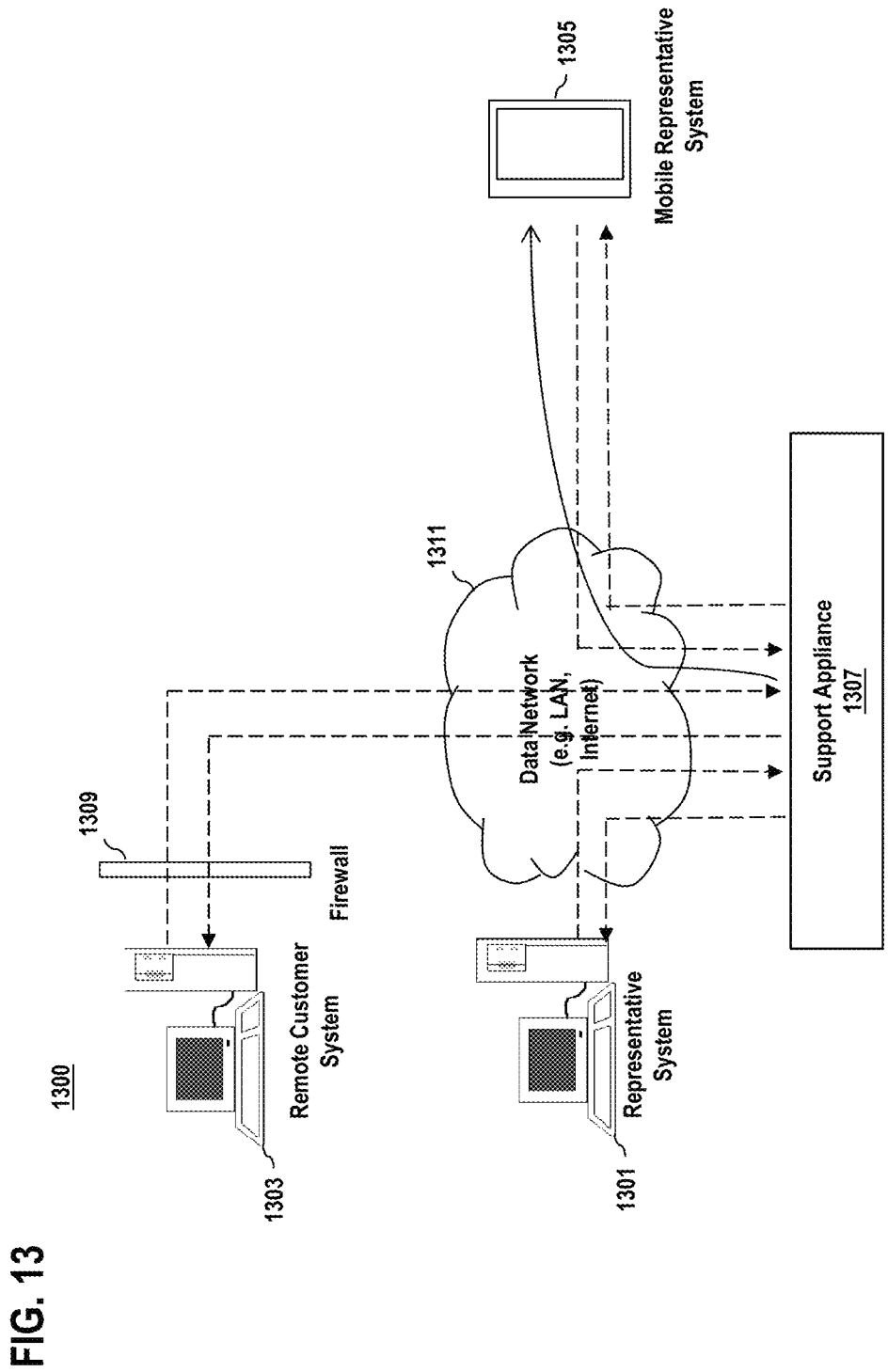

In certain embodiments, the support appliance 107 can be implemented to accommodate a mobile representative system (as depicted in FIGS. 11-13) and means to contact that mobile representative system even when the mobile representative system is disconnected from support appliance 107. For example, the support appliance 107 may contact the mobile representative system to offer support based on demand for the support, rather than requiring always-on connectivity from the mobile representative system. Such capability effectively extends availability of one or more representatives for a remote support service.

In the scenario of FIG. 1A, the support appliance 107 can serve as a remote support and management system for an organization that is receiving support from a subject matter expert (or vendor). In one embodiment, the support appliance 107 is implemented according to an onsite deployment model. A hosted Software-as-a-Service (SaaS) model can also be an offering of this approach where the customers' as well as the vendors' self-administered solutions can be in a hosted infrastructure. In addition, the support appliance 107 can be further defined as a physical or virtual computing system. This can include but not limited to a server rack-mountable server, non-rack-mountable server, desktop computer, laptop computer, and virtual machines.

In one exemplary embodiment, the support appliance 107 is a rack-mountable (e.g., 1U) network appliance that can be installed and deployed at customers' site; in this manner, data security is in the customers' full control. The support appliance 107 can operate through firewalls 109 and the like (e.g., proxy servers). The support appliance 107 is designed such that the local and remote software client connects outbound to the support appliance 107, thereby eliminating firewall incompatibilities.

Additionally, the support appliance 107 has the capability of allowing on demand product use from anywhere in the world. For example, as long as the support appliance 107 is deployed accessible via a public IP address, a support user can log into his/her account via a web interface hosted on the support appliance 107 or use a mobile application to connect to and gain access to the support appliance 107.

A representative client (local client) can be downloaded from a web interface to provide remote access or support. In one embodiment, a representative client may be interchangeably a mobile representative client. Also, a customer client (remote client) can be downloaded by submitting an incident by visiting a support portal web interface—which can also be hosted on the support appliance 107. In another embodiment, the representative client and the customer client can be downloaded from a third party hosted or organization's self-hosted download location or store.

The support appliance 107, in various embodiments, executes software applications that can receive, handle, manage, and dispatch system or data messages to and from the Representative Client and the Customer Client via a secure connection (e.g., 256-bit Advance Encryption Standard (AES) Secure Sockets Layer (SSL)).

As seen in FIG. 1A, a communication system 100 may include a representative (Rep) at a representative system 101 (local system) that provides support to a customer at a remote customer system 103 (remote system). Additionally, a vendor representative system 105 (e.g., a subject matter expert) communicates with the support appliance 107. The traffic between the local and remote systems is handled and managed at the support appliance 107. Because the system is designed such that all session initiations are outbound towards the support appliance 107, the support appliance 107 works through firewalls 109 and the like (e.g., proxy servers). In one embodiment, the elements of the communication system 100 may communicate with each other over a data network (e.g., a local area network LAN, the Internet, etc.).

In certain embodiments a third party vendor provides the subject matter expertise in resolving support issues or incidents in real time whereas in other embodiments highly skilled employees of an organization provide the expertise.

In certain embodiments, the organization can create vendor portals for providing remote access, remote control, and subject matter expertise by vendors to internal systems and applications. For example, the organization can then administer their vendor agents' security policies that control access rights, remote control permissions, and other parameters and guidelines. Consequently, the vendor support agents are provided with only the level of access to the organization's systems that is required to service the systems effectively. In one embodiment, all activities relating to vendor remote access and remote control through the Vendor Portals are recorded and can be audited to ensure compliance with the organization's regulations. Under this arrangement, an organization can receive support from one or more technical vendors, while maintaining complete control over the vendor's level of access as well as a complete audit trail of the vendor's activity. This decreases the organization's liability associated with receiving technology support from a vendor.

In addition to providing a secure way for an organization to receive support from a technology vendor, the support appliance 107 can be extended to enable the technology or technology services vendor to support their other customers more securely and efficiently through establishing a connection between a support appliance associated with the vendor and support appliances associated with their customers and vendor portals within the support appliances. For example, the customers of the organization can themselves utilize the support appliance 107; accordingly the organization's system can connect to its customers' support appliance via their respective vendor portals. In this manner, the vendor can create and administer support agent accounts for their own system. The vendor's support agents can then log into their own secure and self-administered system, and then, through an established connection to their customer's secure and self-administered system's vendor portal, the representatives can gain access to the customer's systems and applications. In this way, both the organization receiving support and the technology vendor can administer their own approaches. However, even though the support solutions are connected, the organization receiving support has complete control over the permissions of the vendor's support agents when those agents are accessing the organization's systems and applications. With connected vendor remote support and management systems, the vendor organization can administer its own support agents and easily remotely access its customers' systems and applications, while at the same time giving its customers complete control over vendor's access permissions and complete visibility into the vendor's activity. Additionally, connected appliances provide both the vendor and the organization receiving support auditable reports on support agent activity and reports of support agent performance.

A standardized, secure vendor remote support and management system such as this will provide a way not only for giving support to users and customers but also a way of receiving support from their vendors.

In one embodiment, the vendor portal can also be extended to serve as a proxy for all attended support (when an end user is present) as well as unattended support (when an end user is not present). In an unattended scenario, the vendor portal can be used as a mechanism to push a remote support executable to an end system and/or used as a mechanism to initiate a pre-installed client to establish a remote support session back to the support agent. For preinstalled clients, this vendor portal can also serve as an agent to collect data and statuses related to the remote systems. The data can be later synched with a connected vendor's support appliance. For systems that are not connected to the internet, this vendor portal can also serve as a proxy for all remote access and remote control data, enabling a technology vendor to support systems over the Internet even if the supported systems are not directly connected to the internet.

The vendor portal can also be used to conduct training.

Furthermore, it is noted that the self-administered customer's support appliance can serve as a vendor's support appliance. Hence, a customer can be a vendor, and vice versa.

By way of illustration, the following scenarios are described for deployment of the support appliance 107: (1) ad-hoc vendor remote support; (2) unmediated vendor remote support and management; and (3) vendor portal as an agent and a proxy.

With respect to ad-hoc vendor remote support, it is recognized that an internal support agent sometimes requires third-party assistance in providing support to an internal or external end-user or system. In this scenario (as shown in FIG. 1B), a request for assistance is sent to the vendor support agent and access privileges to the end system are granted ad-hoc (step 113). The vendor or third party support agent downloads the remote support application used for providing support (step 115), logs on with provided valid credentials or without requiring credentials, and joins or views the remote support session to assist the internal support agent in troubleshooting or supporting the end system (step 117). The internal support agent may be present throughout the remote support session or leave the remote support session after the vendor support agent joins the session (step 119).

Figure 2A:
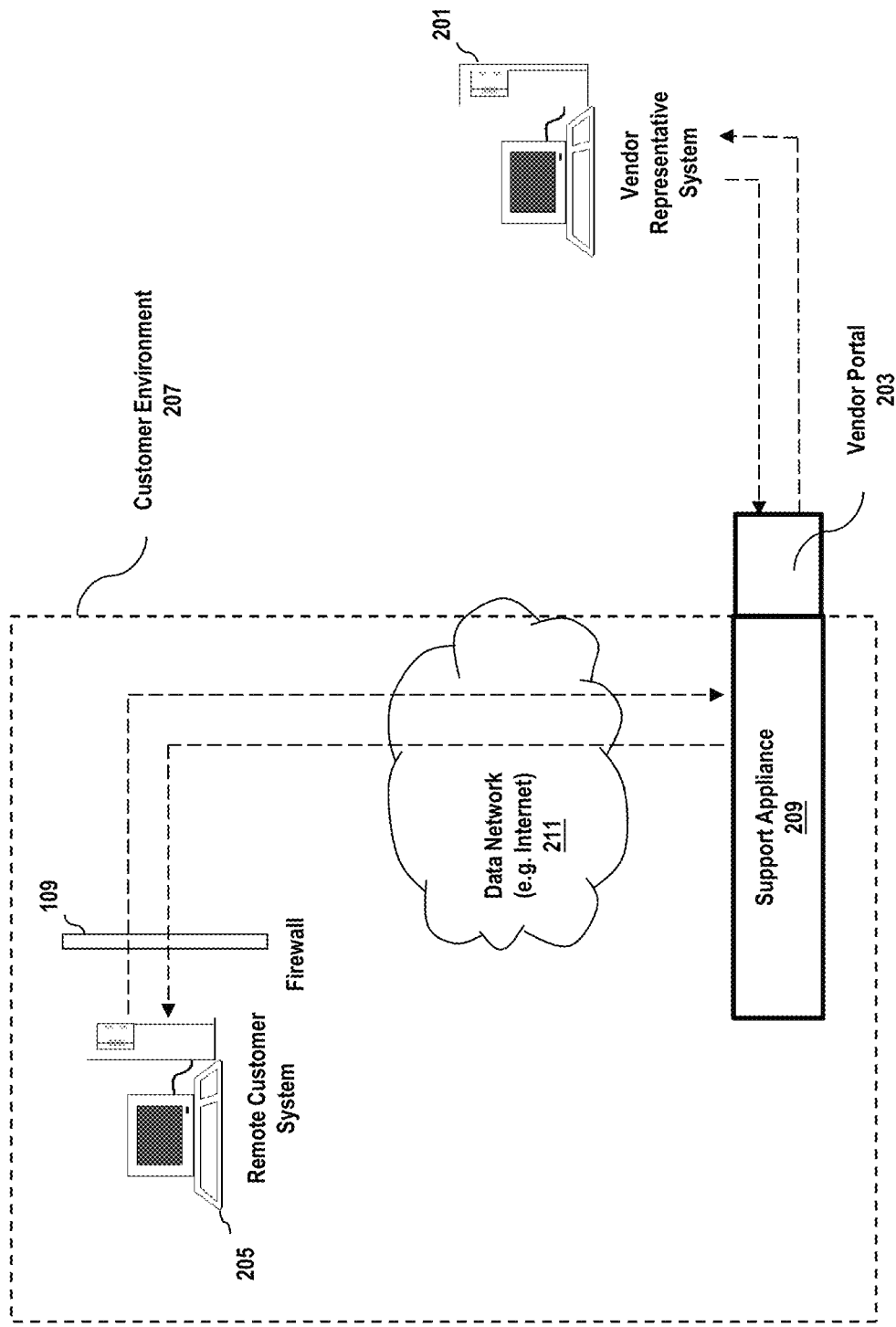
FIGS. 2A and 2B are, respectively, diagrams of a system and associated process for providing vendor presence on a customer appliance, according to certain embodiments.
Figure 2B:
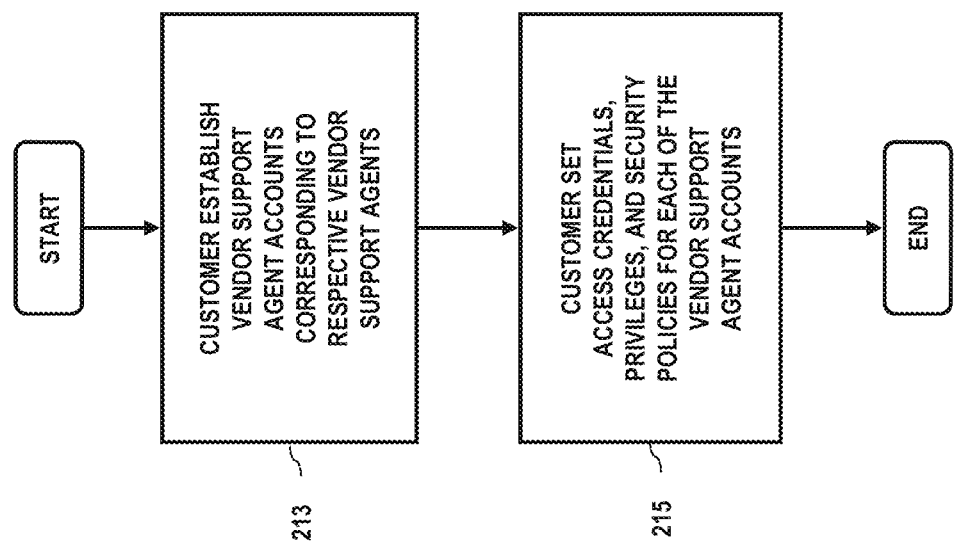

FIGS. 2A and 2B are, respectively, diagrams of a system and associated process for providing vendor presence within a customer environment 207, according to certain embodiments. For this scenario, the system 200 in FIG. 2A may include a vendor support agent at a vendor representative system 201 that requires unmediated access to an organization's systems and applications within the customer environment 207. This level of access can be enabled by creating a vendor portal 203 within the customer's support appliance 209 that controls access privileges and permissions. With this vendor portal 203, the vendor support agent can provide attended or unattended remote support for the customer's systems and applications over the data network 211, for example, on a remote customer system 205 via remote access and remote control. In one embodiment, a customer's support appliance 209 can have multiple vendor portals.

By way of example, two approaches are described. One approach provides vendor presence within the customer environment 207. In this scenario (shown in FIG. 2A), the vendor support agent's accounts and restrictions of the at the vendor representative system 201 are managed and provisioned on the customer's support appliance 209 (step 213 of FIG. 2B). The customer administers a team of vendor support agent accounts that are used only by a specific vendor. The customer can create and administer multiple such teams for multiple vendors. The vendor support agents in this scenario must use access credentials, privileges, and security policies set forth by the customer (step 215 of FIG. 2B). This team created for vendor support agents serves as a component of the vendor presence within the customer environment 207. The combination of team, restrictions, and access interfaces are components that make up the vendor portal 203 in this scenario.

In another approach, the vendor's presence is on the customer environment 207 through relationship with the vendor representative system 201.

Figure 3B:
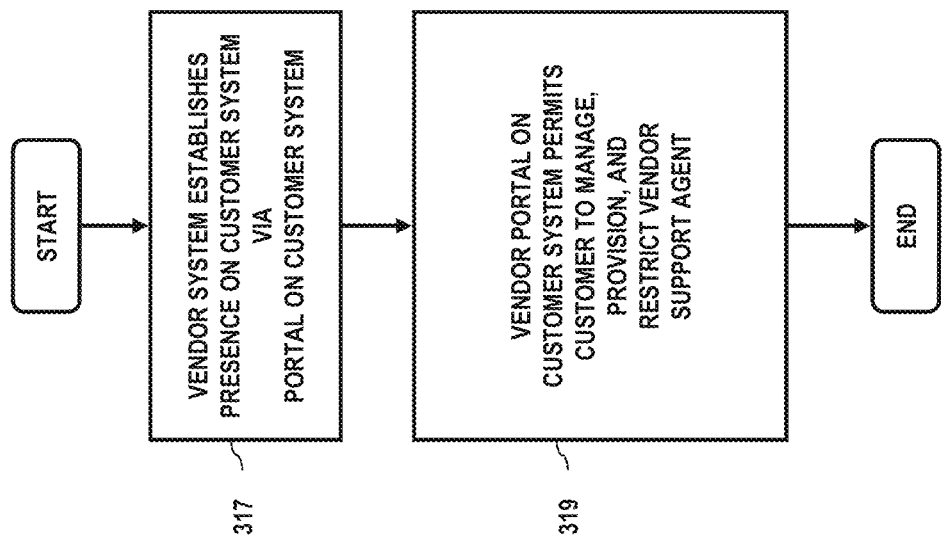

FIGS. 3A and 3B are, respectively, diagrams of a system and associated process for providing vendor presence on a remote customer system 309 associated with a remote data network 313 through a customer's support appliance 303 via a vendor's support appliance 305, according to certain embodiments. As seen in FIG. 3A showing the system 300, the vendor support agent accounts are managed and provisioned on the vendor representative system 307 associated with the vendor's data network 311 (step 317 of FIG. 3B). The vendor portal 301 on the customer's support appliance 303 enables the customer to further manage, provision, and restrict the vendor support agents as a whole or singularly that are connected to the vendor portal 301 through the vendor support appliance 305 (step 319). The customer's support appliance 303 and the vendor's support appliance 305 can communicate over the data network 315 (e.g., the Internet).

Figure 4:
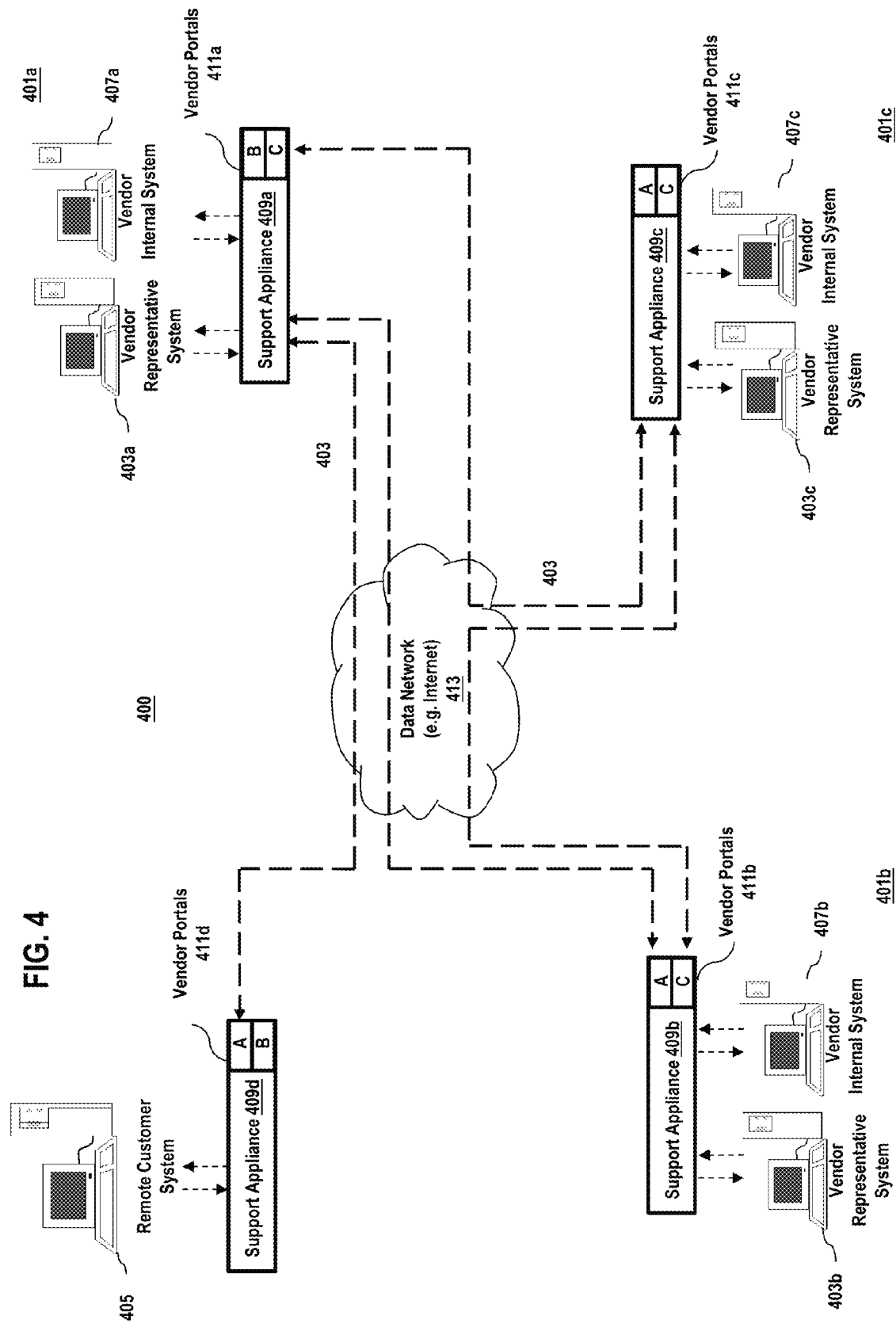
FIG. 4 is a diagram of a system of support appliances with vendor presences, according to one embodiment.

FIG. 4 shows a system 400 of remote support systems 401a-401c with vendor presences through connections with vendor systems 403a-403c. A remote customer system 405 can act as a vendor system; and a vendor system can act as a customer system if configured to do so (for example: a technology vendor may also be a customer to other technology vendors). Each of the remote support systems 401a-401c may include one or more vendor internal systems 407a-407c. Further, each of the remote support systems 401a-401c may include respective support appliances 409a-409c. Further, the system 400 may include a remote customer system 405 that receives support from one or more of the remote support systems 401a-401c. The remote customer system 405 may also include a support appliance 409d. The support appliances 409a-409d may include vendor portals 411a-411d for the various vendors associated with the remote systems 401a-401c. The various remote support systems 401a-401c and the remote customer system 405 may communicate with each other over the data network 413, such as, for example, the Internet. Different portals 411a-411d of the various support appliances 409a-409d may be associated with specific ones of the remote support systems 401a-401c and/or the remote customer system 405. Thus, as illustrated in FIG. 4, a system 400 may include any number of remote support systems connected through support appliances, where each support appliance may have one or more specific vendor portals for the specific vendors within the system 400.

Figure 5B:
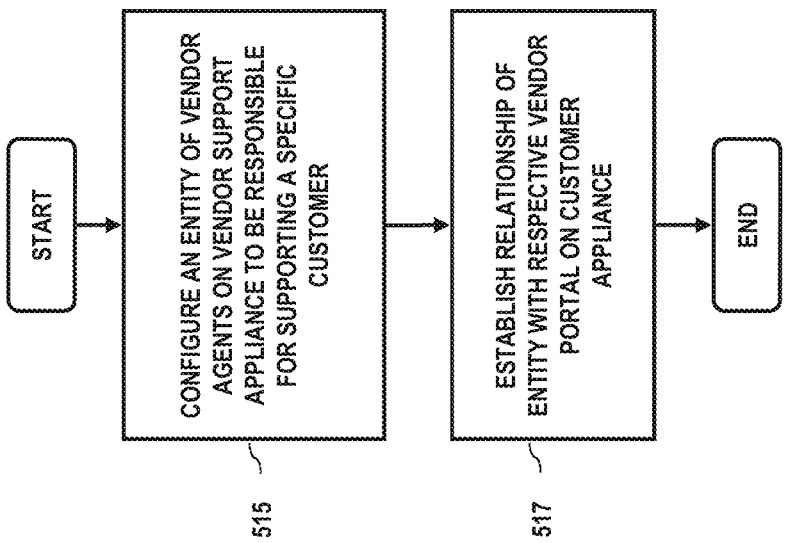
FIGS. 5A and 5B are flowcharts of processes for establishing relationships between vendor and customer remote support systems, according to one embodiment.
Figure 5A:
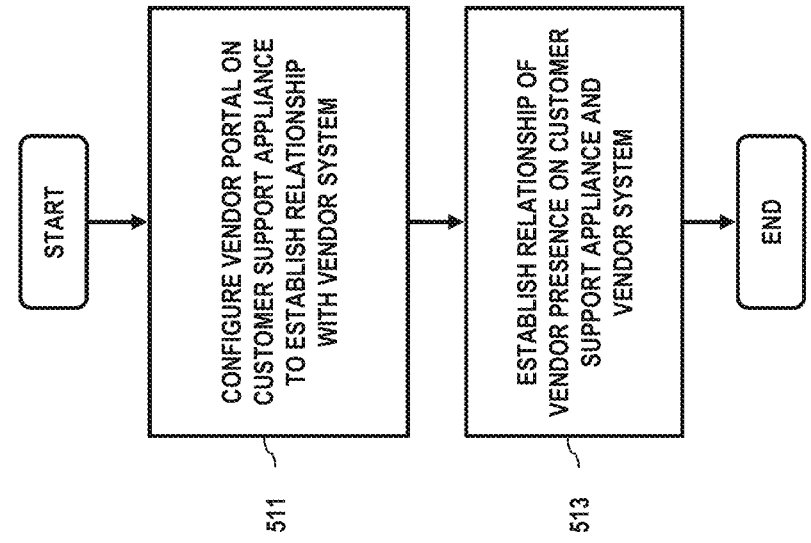

FIGS. 5A and 5B show the configuration methods of establishing a relationship between a vendor's remote support entity on their support appliance and the organization receiving support's vendor portal on their remote support appliance. As seen in FIG. 5A, the vendor portal on the customer support appliance is configured to establish a relationship with the vendor support appliance (step 511). Subsequently, vendor presence is provided on the customer support appliance (step 513). In another embodiment (shown in FIG. 5B), an entity of the vendor agent on the vendor support appliance is configured to be responsible for supporting a specific customer (step 515). Thus, a relationship is established with the corresponding vendor portal on the customer support appliance (step 517).

Figure 6C:
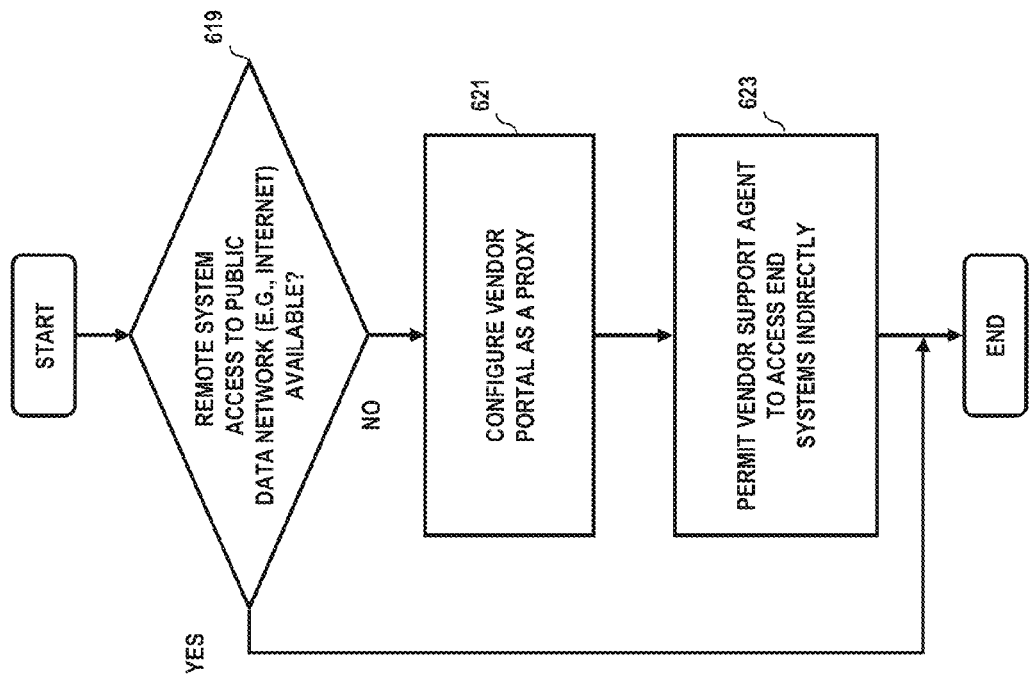
Figure 6B:
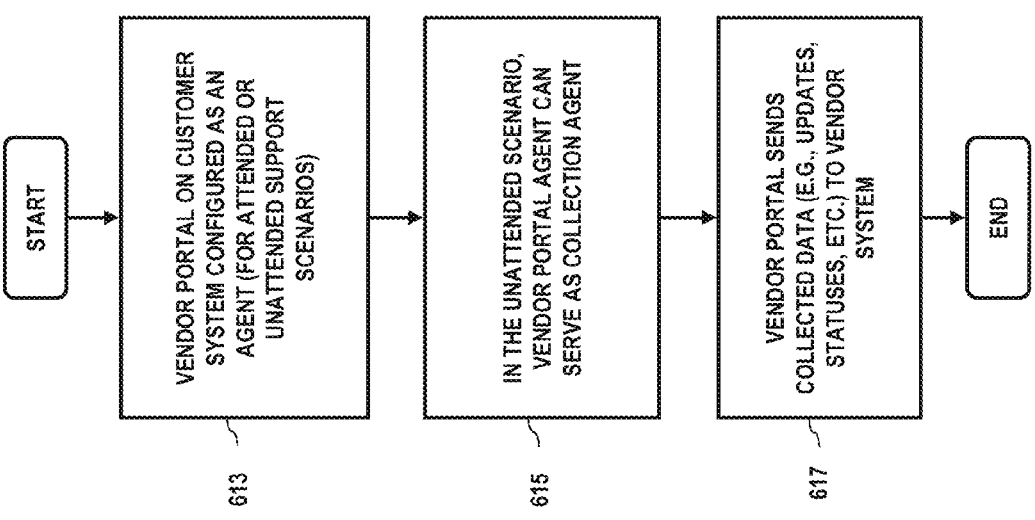

FIGS. 6A-6C are diagrams of a system 600 and associated processes for providing a vendor portal as an agent or a proxy, according to certain embodiments. The vendor portals 601a on the customer support appliance 603a associated with a customer environment 613 can serve as an agent for both attended and unattended support scenarios (step 613). One such support scenario is through enabling a remote support application to be pushed to one or more of the remote customer systems 605a-605e from the vendor representative system 607 and/or a vender internal system 609 associated with the vendor representative system 607, executed, and connected back to the vendor support agent via the vendor support appliance 603a and one or more vendor portals 601a. For unattended systems that have been configured with a preinstalled remote support client, the vendor portal agent can serve as the collection agent for updates and statuses from the remote support client (step 615). The vendor portal agent can send these collective updates and statuses to the vendor support appliance 603b in a batched manner periodically (step 617). For attended and unattended support scenarios in which the remote customer systems 605a-605e do not have access to a public data network 611 (e.g., Internet), the vendor portal 601a can serve as a proxy (steps 619-621), enabling the vendor support agent to access remote customer systems 605a-605e through the Internet indirectly through the vendor portal 601a even though the remote customer systems 605a-605e do not have direct access to the Internet (step 623).

Figure 7:
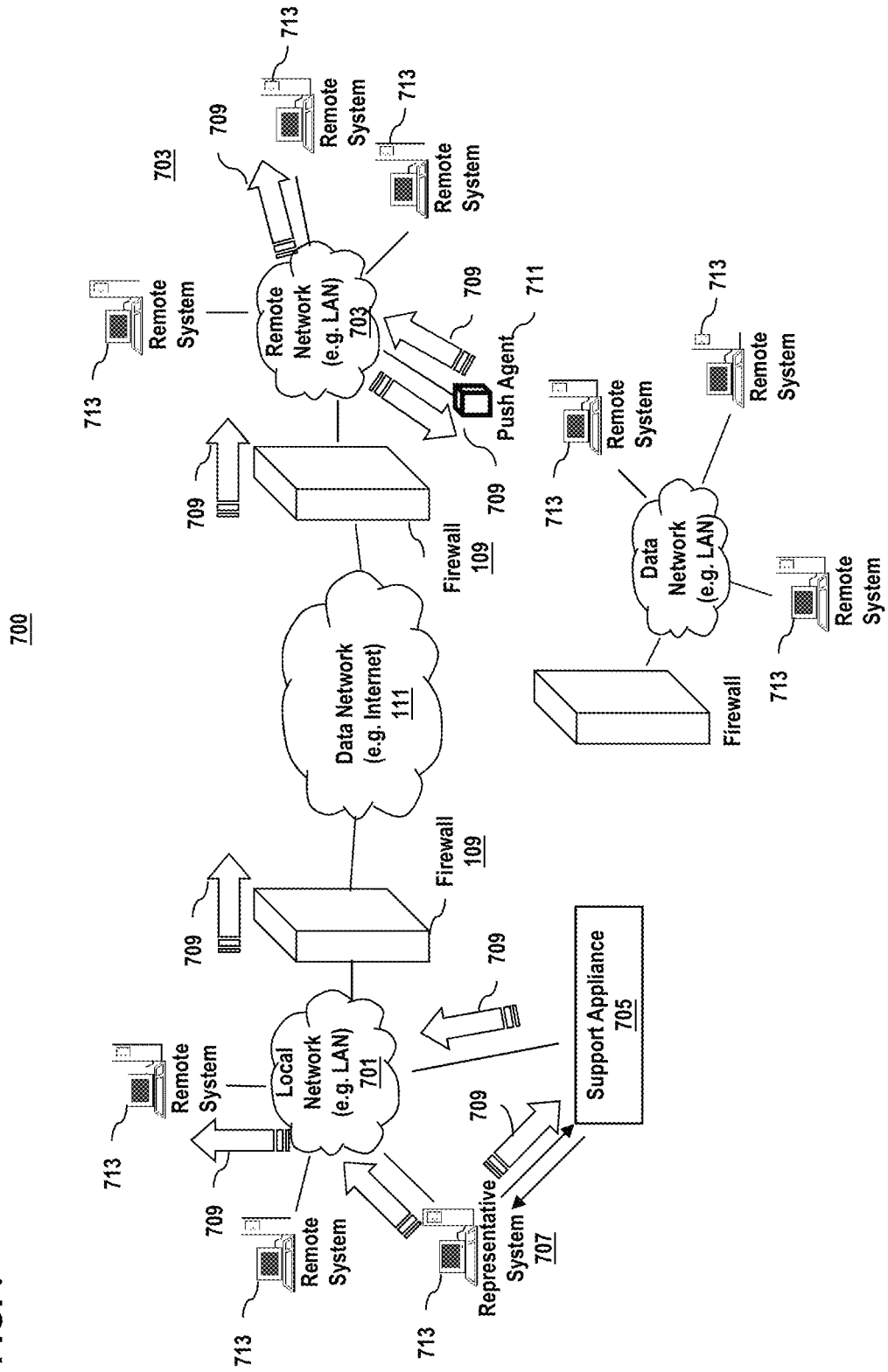
FIG. 7 is a diagram of a system capable of providing Push and Start technology within a local area network (LAN) as well as remote networks, according to one embodiment.

FIG. 7 is an illustration of a system 700 capable of providing Push technology within a local area network (LAN) 701 as well as within a remote network 703, according to one embodiment. Within an exemplary context of remote support by remote controlling or accessing another computer, "Push" is a feature that allows a support representative to transfer an application to a remote computer in need of support and have the application executed whereby enabling the support representative to then remotely control or access the remote computer. No interaction is required at the remote computer for the process to complete, but interaction may optionally be enabled that allows any user present at the remote computer to refuse access for whatever reason. The support representative may or may not be required to have or to enter authentication/authorization credentials to gain access to the computer in need of support. The requirement of credentials would depend on the transfer and/or execution method used in the Push process. Furthermore, this process, unlike conventional approaches, requires no existing piece of the support product to have been previously installed on the remote computer.

In one embodiment, the actual Push of software to the remote computer and its execution can be accomplished via SMB (System Management Bus), Windows RPC (Remote Procedure Calls)/IPC (Inter Process Communication), Unix/Posix RPC, FTP (File Transfer Protocol), SSH (Secure Shell), HTTP (Hypertext Transfer Protocol) or other means.

The system, according to various embodiments, utilizes the following components (not shown): (1) a representative client application; (2) a Push Server—which is what handles the operations in within the appliance; (3) an optional Push Agent; and (4) a customer client application. It is contemplated that the Push Agent can be an application that is installed on a system or alternatively can be a standalone piece of hardware. The Push Server can be an application installed on a support appliance or a system or alternatively can also be a standalone piece of hardware. The Push Server can also be a piece of software integrated into the representative client application where it serves its purpose within the application in the background.

Furthermore, this Push Agent can be used as an agent for other purposes, such as a connection agent to another server in this network or the second network; that is, providing a connection to and forwarding of operations via a Push Agent from a first network to a device of a second network.

In this example, a customer client application resident within a support appliance 705 or a Push server can be accessed by a service representative system 707, which is running a representative client application. The customer client application can be transferred to a remote system in this network (Local Push) by utilizing a 'Push Agent' system or the service representative system's representative client application. In this manner, an IT service representative, for instance, can perform problem resolution, maintenance, and infrastructure development tasks quickly and easily from a single point.

The network visibility of the support representative's computer is limited to the networks to which it is connected. Therefore, with no extra means provided, the reach of the Push feature from the support representative's computer is limited to only those computers to which network traffic is routable. To extend this range, a Push Agent is introduced; for example, one such an agent is known as Jumpoint™ by Bomgar™. The Push Agent, in an exemplary embodiment, is an application installed on a computer that can perform the push-and-execute operation on behalf of authorized support representatives. Alternatively, the Push Agent can be a standalone piece of hardware. The support representatives may be in contact with the Push Agent by their mutual participation on an overlay network, by HTTP (Hypertext Transfer Protocol), VPN (Virtual Private Network), by programmatic email, or by any other means devised for the support representative's computer to communicate with the Push Agent. The 'Push Agent' supports a fully integrated software distribution mechanism for ease of installation of the remote access and control Push Agent on a managed system (e.g., remote access and control appliance or computer) over the network.

It is contemplated that the Push Agent can be an application that is installed on a system or alternatively can be a standalone piece of hardware. The Push Server can be an application installed on a support appliance or a system or alternatively can also be a standalone piece of hardware. The Push Server can also be a piece of software integrated into the representative client application where it serves its purpose within the application in the background.

Furthermore, this Push Agent can be used as an agent for other purposes, such as a connection agent to another server in the second network; that is, providing a connection to and forwarding of operations via a Push Agent, from a first network to a device of a second network.

After the support representative system is connected to the remote Push Agent (which reside within a support appliance or a computer) via the Push Server, the service representative system prompts the remote Push Agent to transfer an application to a remote computer, which resides outside of the network. In an exemplary embodiment, a Web browser based remote control is available and can perform a push instruction from a remote site to a targeted Push Agent. Upon receiving a request, the remote Push Agent transfers the application to a client remote system 713. For example, the arrow indicators 709 represent one or more Push commands for transferring an application to a remote computer (remote system) within the local network 701 or the remote network 703 in conjunction with the support appliance 705 and, in some embodiments, the push agent 711. In this manner, integrated remote access and control tools enable both efficient remote problem resolution and critical visibility limitation when deploying an application to a targeted client remote system. This also enables a service representative to efficiently implement application tools and maintain security throughout the enterprise right from the representative's desk.

In an exemplary embodiment, the appliance uses certificate-based authentication to establish a persistent connection to the Push Agent. When requesting a remote control session on a remote system via the Push functionality, the support appliance ensures that the representative has the right to push the customer client application to a targeted remote client system. The customer client application then can be transferred from the Push Agent to the remote client system. The remote client system can then establish a session connection to the service representative's system.

Figure 8A:
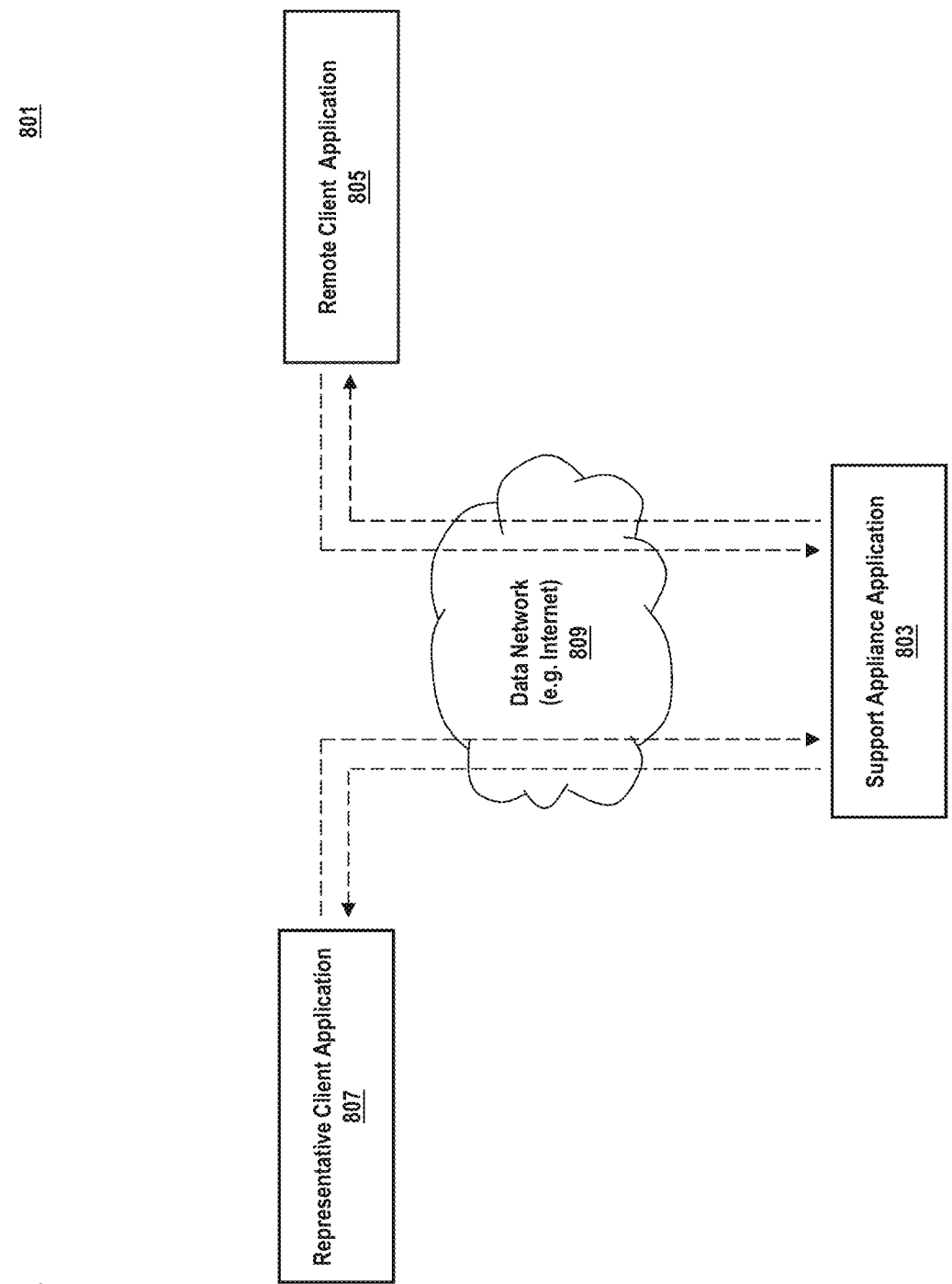
FIG. 8A is a diagram of the software architecture of the communication system of FIG. 1, according to one embodiment.

FIG. 8A is a diagram of the software architecture of the communication system of FIG. 1, according to one embodiment. The product data transfer architecture 801, in one embodiment, is designed with the basis of a message handling and routing system called the Message Router System (MRS). The MRS provides a message routing engine that enables the routing of data from one router to another router.

In addition to the above described inter-router communication, the MRS can communicate with other modules within the application, including the support appliance application 803, the remote client application 805, and the representative client application 807, for example, over a data network (e.g., the Internet) 809. The support appliance application 803 may include an operating system (OS), a Secure Sockets Layer (SSL) module, an above-mentioned MRS module, a user interface module, a recorder module, a dispatcher module, various permissions module, and a storage/logging module. The remote client application 805 may include a graphical user interface (GUI) portion that includes a communication interface and a screen viewing and control interface. The remote client application 805 may further include a backend associated with a file transfer manager, a screen viewing and control manager, and a communication manager, in addition to an MRS module. The representative client application 807 may also include a GUI that includes a file transfer interface module, a communication interface, a session management interface module, and a screen viewing and control interface. On the backend, the representative client application 807 may include a file transfer manager, a screen viewing and control manager, and a communication manager in addition to the MRS module. These router instances provide the means for delivering the appropriate messages to destination modules within their respective applications.

Figure 8B:
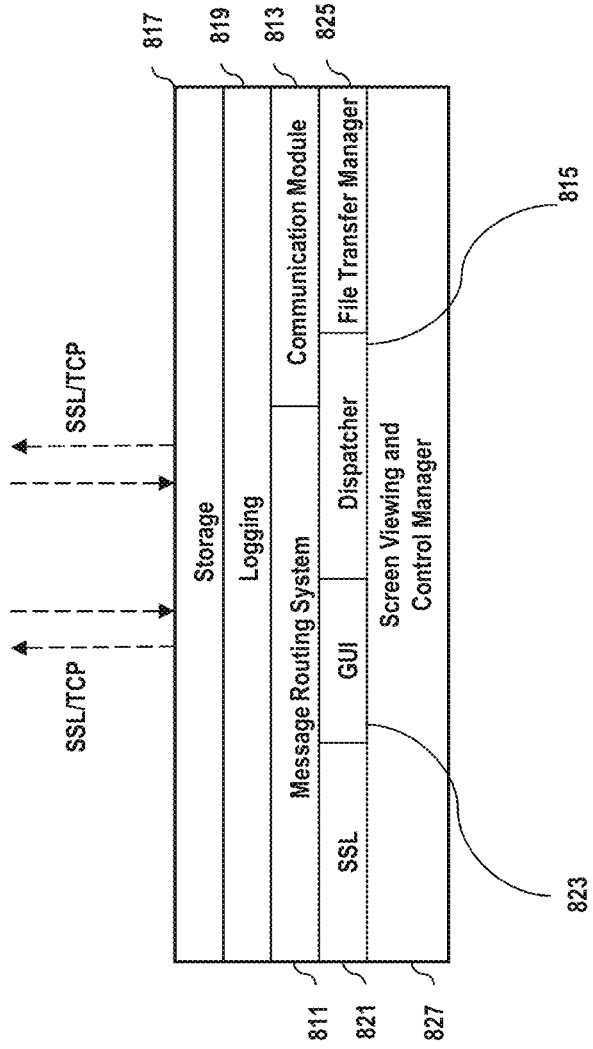
FIG. 8B is a functional diagram of the network elements within the communication system of FIG. 1, according to one embodiment.

FIG. 8B is a functional diagram 810 of the network elements within the communication system of FIG. 1, according to one embodiment. As described, in one embodiment, the network appliance utilizes an OS with a web server for providing web hosting capabilities. The message routing system (MRS) 811, which is a transport layer atop the OS, provides network facilities. Accordingly, the MRS 811 provides the generic means of transporting data from one router to another router.

The communication module 813 receives all chat system and chat data sent from MRS 811 via the dispatcher 815. These messages can be logged in Storage 817 via the Logging Module 819 through the Dispatcher 815.

The secure sockets layer (SSL) module 821 ensures all data transfer from one router to another router is encrypted, e.g., 256-bit AES SSL encryption.

On the client side, the graphical user interface (GUI) software clients 823 are provided, according to various embodiments of the invention. Such GUI software clients 823, in an exemplary embodiment, can be downloaded on demand. These GUI software clients 823 draw updates on the interface according to system messages received. With respect to the representative clients (or local client), a GUI is likewise utilized. Although the representative client is has a GUI interface, it includes a backend component and a GUI component, as shown in FIG. 8B.

Again, the MRS is the medium for handling all messages coming to the representative client from another router and all messages sent from the representative client to another router. MRS 811, in one embodiment, is abstracted from the mobile applications by creating a server that will expose an interface that is easily consumable and acted upon by mobile clients.

The file transfer manager 825 handles all remote-to-local and local-to-remote reading and writing of files. The system messages and file-transfer data are received and sent through the MRS 811.

The screen viewing and control manager module 827, in one embodiment, provides a way to view a remote system's screen and gain control of the system input devices (i.e. keyboard, mouse, etc.) All screen and input data are communicated through the MRS 811.

The processes described herein for providing secure, on-demand remote support may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
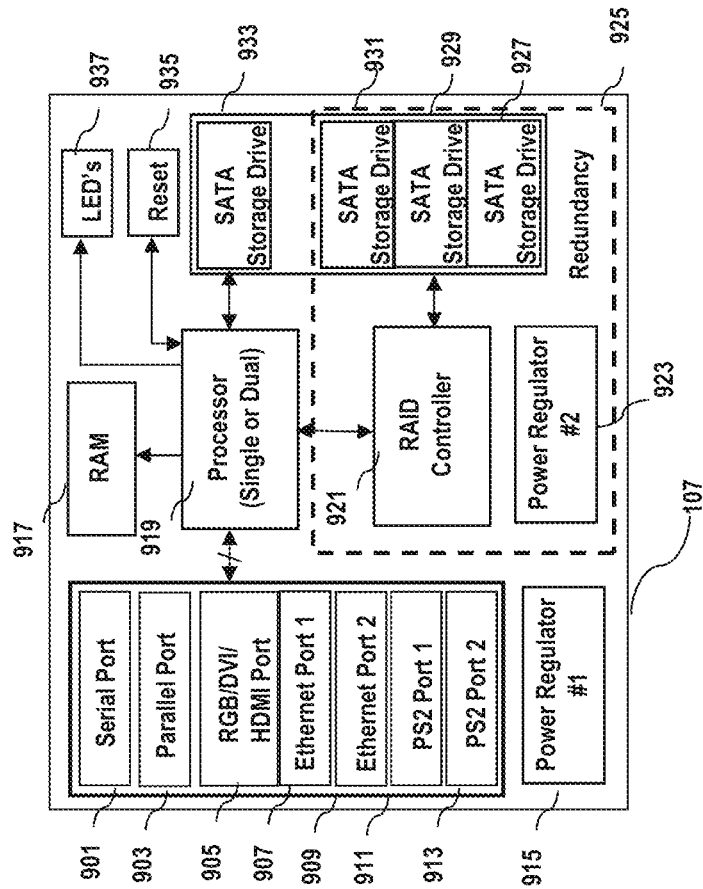
FIG. 9 is an exemplary hardware architecture of a remote access and control appliance, according to one embodiment.

FIG. 9 is a diagram showing exemplary components of a support appliance, according to various embodiments of the invention. The support appliance 107, in one embodiment, comprises various component interfaces, including serial and parallel ports 901 and 903, a display interface (e.g., an RGB (Red, Green and Blue) and/or Digital Visual Interface (DVI) and/or High-Definition Multimedia Interface (HDMI) port 905), local area network (LAN) ports (e.g., Ethernet ports) 907 and 909, and input device ports (e.g., PS2) 911 and 913. The support appliance 107 also contains a power regulator 915, internal memory in the form of RAM (Random Access Memory) 917, one or more processors 919, each which may be a single or multi-core processor, LEDs (Light Emitting Diodes) 937, reset control 935 and a SATA (Serial Advanced Technology Attachment) storage drive 933.

As mentioned, the network appliance 101, in an exemplary embodiment, can be a 1U rack-mountable server hardware. However, it is contemplated that configurations other than those illustrated in FIG. 9 can be constructed, depending on the particular applications. For example, different types of appliances can be designed for different uptime requirements. With uptime-critical customers, the support appliance 107 provides for fail-over redundancies; e.g., use of multiple disk drives 927-931, for Fail-over and Hot-Swap capabilities via a RAID (Redundant Array of Independent Disks) controller 921. This configuration of the support appliance 107 can also be equipped with a backup AC-DC (Alternating Current-Direct Current) regulator 923, which can be triggered when the main regulator 915 is detected as non-functional. Alternatively, for non-uptime-critical customers, the support appliance 107 can be configured without the additional hardware and/or software required for providing redundancies.

In one embodiment, the network appliance is running an operating system (OS). Also, a web server runs on top of the OS for providing web hosting capabilities. Further, other application modules (as shown in FIG. 8) can run on top of the OS; for example, SSL.

Figure 10:
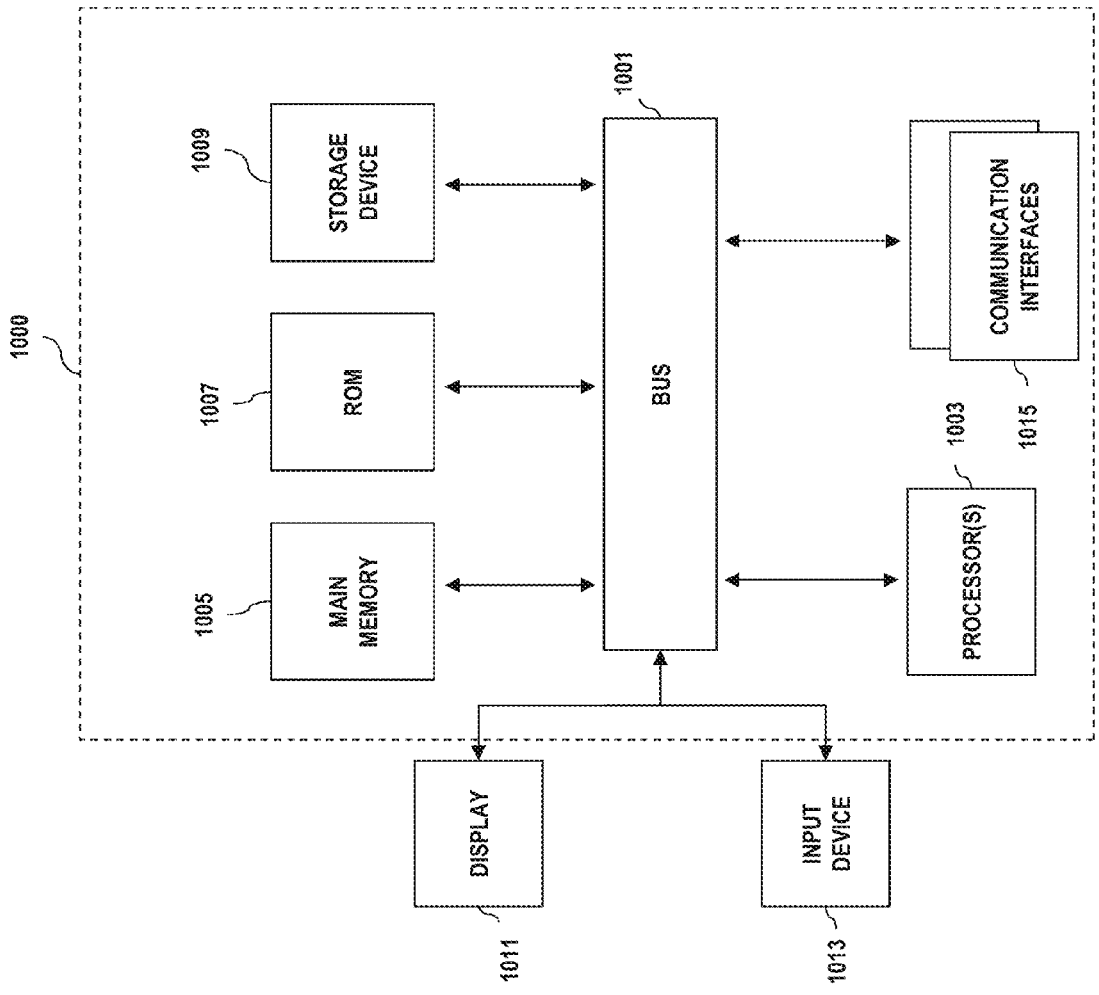
FIG. 10 is a diagram of a computer system that can be used to implement various embodiments.

FIG. 10 illustrates a computer system 1000 upon which an embodiment according to the invention can be implemented. For example, the processes described herein can be implemented using the computer system 1000. The computer system 1000 includes a bus 1001 or other communication mechanism for communicating information and a processor 1003 coupled to the bus 1001 for processing information. The computer system 1000 also includes main memory 1005, such as a random access memory (RAM) or other dynamic storage device, coupled to the bus 1001 for storing information and instructions to be executed by the processor 1003. Main memory 1005 can also be used for storing temporary variables or other intermediate information during execution of instructions by the processor 1003. The computer system 1000 may further include a read only memory (ROM) 1007 or other static storage device coupled to the bus 1001 for storing static information and instructions for the processor 1003. A storage device 1009, such as a magnetic disk or optical disk, is coupled to the bus 1001 for persistently storing information and instructions.

The computer system 1000 may be coupled via the bus 1001 to a display 1011, such as a cathode ray tube (CRT), liquid crystal display, active matrix display, or plasma display, for displaying information to a computer user. An input device 1013, such as a keyboard including alphanumeric and other keys, is coupled to the bus 1001 for communicating information and command selections to the processor 1003. Another type of user input device is a cursor control 1015, such as a mouse, a trackball, or cursor direction keys, for communicating direction information and command selections to the processor 1003 and for controlling cursor movement on the display 1011.

According to one embodiment, the processes described herein are performed by the computer system 1000, in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multi-processing arrangement may also be employed to execute the instructions contained in main memory 1005. In alternative embodiments, hard-wired circuitry may be used in place of or in combination with software instructions to implement the embodiment of the invention. Thus, embodiments of the invention are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, a telephone modem, or any other communication interface to provide a data communication connection to a corresponding type of communication line. As another example, communication interface 1017 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a PCMCIA (Personal Computer Memory Card International Association) interface, etc. Although a single communication interface 1017 is depicted in FIG. 10, multiple communication interfaces can also be employed.

The network link 1019 typically provides data communication through one or more networks to other data devices.

For example, the network link 1019 may provide a connection through local network 1021 to a host computer 1023, which has connectivity to a network 1025 (e.g. a wide area network (WAN) or the global packet data communication network now commonly referred to as the "Internet") or to data equipment operated by a service provider. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network (s), the network link 1019, and the communication interface 1017. In the Internet example, a server (not shown) might transmit requested code belonging to an application program for implementing an embodiment of the invention through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1003 for execution. Such a medium may take many forms, including but not limited to non-volatile media, volatile media, and transmission media. Non-volatile media include, for example, optical or magnetic disks, such as the storage device 1009. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIGS. 11-13 are diagrams of systems and associated processes for providing extended availability of representatives for remote support and management, according to various embodiments. As seen in FIG. 11, a communication system 1100 may include a representative system 1101 that provides support to a customer at a remote system 1103. In one embodiment, the system 1100 may include a mobile representative system 1105 in addition to, or in the alternative of, the representative system 1101. Similar to the discussion regarding FIG. 1, the traffic between the representative system 1101 and/or the mobile representative system 1105 and the remote system 1103 is handled and managed by a support appliance 1107. In one embodiment, the elements of the communication system 1100 may communicate with each other over a data network 1109 (e.g., a local area network LAN, the Internet, etc.).

As illustrated in FIG. 12, the customer system 1201 (e.g., remote system 1103 of FIG. 11) generates a request 1209 for support to the support appliance 1205. In turn, the support appliance 1205 assigns 1211 the request to the representative system 1203 (e.g., representative system 1101 of FIG. 11), which provides the requested support 1213. As shown, a subject matter expert 1207 (via a mobile or desktop based representative system, or a publicly accessible web portal) can communicate with the support appliance 1205, indicate their intent to receive requests for assistance 1215 even when disconnected from the support appliance 1205 and subsequently issue a disconnect command 1217 to disconnect from the support appliance 1205.

Next, the representative system 1203 generates a request 1219 for assistance from the subject matter expert 1207, transmitting the request to the support appliance 1205. The request is then forwarded to the subject matter expert 1207 using the supplied contact information for joining the session 1221 that is in progress between the customer system 1201 and the representative system 1203, wherein the supplied contact information indicates the preferred method of communication including email, instant messaging, short messaging service (SMS), text based messaging, or an application to send and receive uniform resource locator (URL) links. The subject matter expert 1207 can join using a received application or a preinstalled client 1223; such application can signal to the support appliance 1205 to permit the subject matter expert 1207 to join the session and provide remote support 1225.

As seen in FIG. 13, a communication system 1300 may include a representative system 1301 that provides support to a customer at a remote customer system 1303. In one embodiment, the system 1300 may include a mobile representative system 1105 in addition to the representative system 1301. The contact mechanism for the mobile representative system 1305 may be through the support appliance 1307 while the mobile representative system 1305 is disconnected. Similar to the discussion regarding FIG. 1, the traffic between the representative system 1301 and/or the mobile representative system 1305 and the remote customer system 1303 is handled and managed by a support appliance 1307. Because the system 1300 is designed such that all session initiations are outbound towards the support appliance 1307, the support appliance 1307 works through firewalls 1309 and the like (e.g., proxy servers). In one embodiment, the elements of the communication system 1300 may communicate with each other over a data network 1309 (e.g., a local area network LAN, the Internet, etc.), when connected.

While the invention has been described in connection with a number of embodiments and implementations, the invention is not so limited but covers various obvious modifications and equivalent arrangements, which fall within the purview of the appended claims.

What is claimed is:

1. A method comprising:
determining, by a network appliance, a security policy controlled by a system of an organization;
creating, by the network appliance, an association between the security policy and access to the system,
wherein the security policy is administered for a remote support service and a remote support agent, the remote support service and the remote support agent disconnected from the system, and
wherein the determination of the remote support service and the remote support agent is based on an on-demand need of the system for the remote support service, and the on-demand need of a known expertise of the remote support agent;
creating, via the network appliance, one or more portals where the access is based on the security policy,
wherein the one or more portals are configured to serve as a proxy for attended and unattended remote support,
wherein the one or more portals are configured to push a remote support executable to the system, initiate a pre-installed client to establish a remote support session, or a combination thereof, and
wherein the access includes connectivity for providing, in real-time and responsive to the on-demand need of the system for the remote support service, the remote support service to the system from a remote support service disconnected from the system; and
notifying, via the network appliance, the remote support agent to connect and provide ad-hoc the on-demand support in real time to the system via the one or more portals responsive in real-time to the on-demand need of the known expertise of the remote support agent,
wherein the notifying of the remote support agent includes email, instant message, short message service, text message, sending an application, or a combination thereof.

2. A method according to claim 1, further comprising:
determining a customer associated with the system; and
connecting the remote support agent to the customer via a portal, wherein the portal provides the organization with information regarding support agent-customer activity.

3. A method according to claim 1, further comprising:
recording support agent activity associated with a portal; and
creating auditable reports, performance reports, or a combination thereof based on the recorded support agent activity.

4. A method according to claim 1, wherein the pre-installed client is configured to collect data and statuses related to a remote system.

5. A method according to claim 1, wherein the one or more portals are configured to enable the remote support agent to support systems not directly connected to the internet.

6. An apparatus comprising:
a portal enabling communications between a remote support agent and a system of an organization, a customer system, or a combination thereof for providing remote support service, the remote support agent disconnected from the system,
wherein the portal is configured to serve as a proxy for attended and unattended remote support,
wherein the portal is configured to push a remote support executable to the system, initiate a pre-install client to establish a remote support session, or a combination thereof,
wherein the apparatus communicates with the remote support agent notifying the remote support agent to connect and provide ad-hoc on-demand support in real time to the system via the one or more portals responsive in real-time to an on-demand need of the system for the remote support service,
wherein the notifying of the remote support agent includes email, instant message, short message service, text message, sending an application, or a combination thereof,
wherein ad-hoc access and real-time connectivity to the system, the customer system, or a combination thereof, is based on a security policy established by the organization and administered for the remote support service and the remote support agent, and
wherein the determination of the remote support service and the remote support agent is based on an on-demand need of the system for the remote support service, and the on-demand need of a known expertise of the remote support agent.

7. An apparatus according to claim 6, wherein the security policy includes levels of access to the system.

8. An apparatus according to claim 6, further comprising:
determining a customer associated with the system; and
connecting the remote support agent to the customer via the portal, wherein the portal provides the organization with information regarding support agent-customer activity.

9. An apparatus according to claim 6, further comprising:
auditable reports, performance reports, or a combination thereof based on support agent activity recorded from the portal.

10. An apparatus according to claim 6, wherein the pre-installed client is configured to collect data and statuses related to a remote system.

11. An apparatus according to claim 6, wherein the portal is configured to enable the remote support agent to support systems not directly connected to the internet.

12. A method comprising:
receiving an on-demand request for a remote support agent of a remote support service to communicate through a portal established on a network appliance enabling communications between the remote support agent and a system of an organization, a customer system, or a combination thereof for providing ad-hoc on-demand, the remote support service in real time responsive to the request, the remote support agent disconnected from the system,
wherein the portal is configured to serve as a proxy for attended and unattended remote support,
wherein the portal is configured to push a remote support executable to the system, initiate a pre-install client to establish a remote support session, or a combination thereof,
wherein the request for the remote support agent includes email, instant message, short message service, text message, sending an application, or a combination thereof,
wherein the security policy is administered ad-hoc for the remote support service and the remote support agent responsive to the request in real-time, and downloading an application from the network appliance, wherein the network appliance facilitates establishment of a remote support session between the system and the remote support agent; and permitting the remote support agent access and connectivity to the system based on a security policy administered for the organization, and based on an on-demand need of a known expertise of the remote support agent.

13. A method according to claim 12, wherein the security policy includes levels of access to the system.

14. A method according to claim 12, further comprising:
determining a customer associated with the system; and
connecting the remote support agent to the customer via the application, wherein the application provides the organization with information regarding support agent-customer activity.

15. A method according to claim 12, further comprising:
recording support agent activity associated with the application; and
creating auditable reports, performance reports, or a combination thereof based on the recorded support agent activity.

16. A method according to claim 12, wherein the portal is configured to serve as a proxy for attended and unattended remote support.

* * * * *